United States Patent
Chen et al.

(10) Patent No.: US 6,810,083 B2
(45) Date of Patent: Oct. 26, 2004

(54) METHOD AND SYSTEM FOR ESTIMATING OBJECTIVE QUALITY OF COMPRESSED VIDEO DATA

(75) Inventors: Yingwei Chen, Briarcliff Manor, NY (US); Jorge Caviedes, Yorktown Hts, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 539 days.

(21) Appl. No.: 09/996,003

(22) Filed: Nov. 16, 2001

(65) Prior Publication Data

US 2003/0112333 A1 Jun. 19, 2003

(51) Int. Cl.$^7$ ............................................... H04N 7/12
(52) U.S. Cl. ........................... 375/240.25; 375/240.26; 375/240.03
(58) Field of Search ........................ 375/240.12, 240.13, 375/240.18, 240.19, 240.24, 240.25, 240.26, 240.27, 240.29, 243, 240.03; 348/420.1, 425.1, 425.2, 408.1, 671; 382/235, 237, 268, 276, 251; 725/107, 130, 150

(56) References Cited

U.S. PATENT DOCUMENTS

| | | | | |
|---|---|---|---|---|
| 5,790,717 | A | * 8/1998 | Judd | 382/323 |
| 6,101,278 | A | 8/2000 | Chen et al. | 382/239 |
| 6,185,253 | B1 | * 2/2001 | Pauls | 375/240.02 |
| 6,654,417 | B1 | * 11/2003 | Hui | 375/240.03 |
| 2002/0168007 | A1 | * 11/2002 | Lee | 375/240.03 |
| 2003/0023910 | A1 | * 1/2003 | Myler et al. | 714/704 |
| 2003/0031368 | A1 | * 2/2003 | Myler et al. | 382/228 |

OTHER PUBLICATIONS

Furusho et al., "Picture quality evaluation model for color coded images: considering observing points and local feature of image", International Conference on Image Processing, vol. 4, pp. 343–347, Oct. 1999.*

Miyahara et al., "Objective picture quality scale (PQS) for image coding", IEEE Transactions on Communications, vol. 46, Iss. 9 pp. 1215–1226, Sep. 1998.*

"The Picture Appraisal Rating (PAR)—A Single–Ended Picture Quality Measure for MPEG–2", Snell & Wilcox, UK, Jan. 2000, XP002260005.

* cited by examiner

*Primary Examiner*—Vu Le

(57) ABSTRACT

The present invention relates to a method and system for evaluating the quality of encoded video data without gaining access to the source data or the compressed video bitstream. The system is configured to decode compressed video data using an MPEG decoder to produce decompressed video data. The decoded data is analyzed to determine whether the decompressed video data is intra-coded. If so, a discrete cosine transform (DCT) is performed to produce a set of DCT coefficients for at least one AC frequency band in the decompressed video data. At the same time, quantization matrix data of a frame of the decompressed video data as well as a quantizer scale for each block of the decompressed video data are extracted. Thereafter, the variance of the converted DCT coefficients is obtained, and then an average quantization error for each set of said DCT coefficients is determined based on the variance, the quantization matrix, and the quantizer scale. Lastly, a peak signal to noise ratio (PSNR) is calculated based on the resultant average quantization error.

27 Claims, 6 Drawing Sheets

METHOD AND SYSTEM FOR ESTIMATING OBJECTIVE QUALITY OF COMPRESSED VIDEO DATA

BACKGROUND OF THE INVENTION

1. Field of the Invention

The present invention relates to a method and system for measuring the quality of compressed video data and, in particular, to a method and system for assessing the objective quality of compressed pictures, namely Peak-Signal to Noise-Ratio (PSNR), without referring to the source video data.

2. Description of the Related Art

It is the ultimate goal of the video experts to provide most perceptually appealing video images to viewers. One way to determine whether the resulting image quality is good or poor is to ask a panel of viewers to watch certain video sequences to provide their opinions. Another way to analyze video sequences is to provide an automated mechanism to evaluate the excellence or the degradation of the video quality. This type of procedure is known as "objective video quality assessment."

A common approach for measuring the picture quality of a compression process is to make a comparison between the processed image and the unprocessed source images (hereinafter referred to as "double-ended measurement"). Various metrics are used, i.e., Block Artifact Metric (BAM), PSNR, Perceptually Weighted PSNR, etc., to evaluate an objective picture quality measure. In particular, the PSNR is most commonly used parameter for measuring any picture quality, especially in evaluating MPEG-2 video bitstream. However, the double-ended measurement has some drawbacks in that access to both the processed picture and the source picture is not feasible if the source data or the alignment between the source and processed pictures are unavailable. In order to overcome this problem, a "single-ended measurement" has been proposed to monitor the video quality when the source is neither available nor controllable. Unlike the double-ended measurement, the single-ended measurement technique operates on the compressed picture without access to the source picture when evaluating video quality. Although there are various single-ended methods that have been proposed, no single-ended measurement uses the PSNR metric in evaluating the compressed pictures alone without access to the source picture or the compressed video bitstream. Accordingly, the present invention proposes an objective quality assessment using the PSNR metric to evaluate the objective quality of compressed pictures without utilizing the source data or the compressed video bitstream.

SUMMARY OF THE INVENTION

The present invention is directed to an apparatus and method for evaluating the quality of encoded video data without access to the source data or the compressed video bitstream, by utilizing quantization parameters estimated directly from the decompressed picture.

According to an aspect of the invention, the method of evaluating the picture quality includes the steps of: performing a discrete cosine transform (DCT) on at least a substantial portion of the decompressed video data to produce a set of DCT coefficients for at least one AC frequency band; simultaneously, extracting quantization matrix data for at least one AC frequency band and extracting a quantizer scale for each block of the decompressed video data; estimating a variance of the DCT coefficients; determining an average quantization error for each set of the DCT coefficients based on the resultant variance, quantization matrix, and quantizer scale; and, calculating a peak signal to noise ratio (PSNR) based on the average quantization error.

According to another aspect of the invention, the method includes the steps of: performing a DC computation operation to recover an intra-dc-precision level from the decompressed video data; and, if the intra-dc-precision level is less than a predefined threshold, classifying the decoded video data as an intra-coded; performing a discrete cosine transform (DCT) on the decompressed video data to produce a set of DCT coefficients for at least one AC frequency band; extracting quantization matrix data for the at least one AC frequency band; extracting a quantizer scale for each block of the decompressed video data; estimating a variance of the DCT coefficients; determining an average quantization error for each set of the DCT coefficients; and, calculating a peak signal to noise ratio (PSNR) based on the average quantization error.

According to anther aspect of the invention, the apparatus capable of evaluating the quality of encoded video data includes: a decoder for decoding at least a substantial portion of the encoded video data to produce decoded video data including a plurality of blocks; a discrete cosine transform (DCT) configured to transform the decompressed video data into a set of DCT coefficients for at least one AC frequency band; an extractor for extracting quantization matrix data for at least one AC frequency band and for extracting a quantizer scale for each block of the decompressed video data; a collector for estimating a variance of the DCT coefficients; a first calculator for determining an average quantization error for each set of the DCT coefficients based on the variance, the quantization matrix, and the quantizer scale; a second calculator for determining a peak signal to noise ratio (PSNR) based on the resultant average quantization error; and, a picture detector for detecting an intra-coded picture in each block of the decompressed video data. The picture detector further includes a means for performing a DC computation operation to recover intra-dc-precision level from the decompressed video data; and, a means for classifying the decoded video data as an intra-coded picture when the intra-dc-precision level is less than a predefined threshold.

According to another aspect of the invention, the apparatus includes: a decoder configured to decode compressed variable-length Huffman codes and for producing therefrom decoded data, and for extracting quantization matrix data and a quantizer scale for each block of the decoded video data; an inverse quantizer configured to perform inverse-quantizing of the decoded data output from the decoder to produce a set of DCT coefficients; an inverse DCT configured to transform values of pixels in blocks of signals output from the inverse quantizer to dequantize decoded data including the difference data; a motion compensation and adder for receiving reference data within the encoded video data and the difference data from said inverse DCT to form motion compensated pictures therefrom; a collector coupled to the output of the inverse quantizer for estimating a variance of the DCT coefficients; a first calculator for determining an average quantization error for each set of the DCT coefficients based on the variance, quantization matrix, and quantizer scale; and, a second calculator for determining a peak signal to noise ratio (PSNR) based on the resultant average quantization error. The apparatus further includes a video memory configured to store reproduced video data.

The foregoing and other features and advantages of the invention will be apparent from the following, more detailed description of preferred embodiments as illustrated in the accompanying drawings in which reference characters refer to the same parts throughout the various views. The drawings are not necessarily to scale; the emphasis instead is placed upon illustrating the principles of the invention.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

In order to facilitate an understanding of this invention, background information relating to MPEG2 coding is explained. In general, the MPEG2 coding is performed on an image by dividing the image into macro-blocks of 16×16 pixels, each with a separate quantizer scale value associated therewith. The macro-blocks are further divided into individual blocks of 8×8 pixels. Each 8×8 pixel block is subjected to a discrete cosine transform (DCT) to generate DCT coefficients for each of the 64 frequency bands therein. The DCT coefficients in an 8×8 pixel block are then divided by a corresponding coding parameter, i.e., a quantization weight. The quantization weights for a given 8×8 pixel block are expressed in terms of an 8×8 quantization matrix. Thereafter, additional calculations are affected on the DCT coefficients to take into account, namely the quantizer scale value, among other things, and thereby complete MPEG2 coding. It should be noted that other coding techniques, such as JPEG or the like, may be used in the present invention.

Figure 1:
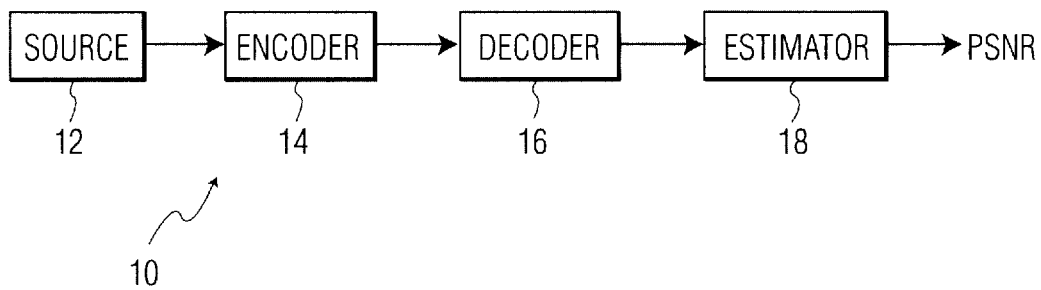
FIG. 1 is a simplified block diagram illustrating the picture quality estimator according to an embodiment of the present invention.

FIG. 1 is a simplified circuit diagram whereto the embodiment of the present invention is applied. The inventive system 10 includes a video source 12, an encoder 14, a decoder 16, and an estimator 18. The source 12 may be any type of video generating device, such as a television camera or other video equipment that is capable of generating video data based on a particular image. The encoder 14 and decoder 16 may be any conventional encoder and decoder known in this art for encoding/decoding MPEG2 video data, respectively. The estimator 18 processes the decoded video data to evaluate the objective quality of compressed pictures without utilizing the source video data or the compressed video bitstream. To achieve this, the present invention relies on a statistical analysis to determine the quality of the picture that has been compressed in a previous coding operation. The statistics of pictures are gathered from the DCT coefficients either after the decompression stage or during the decompression stage, thereby eliminating the need for gaining access to the source picture in accordance with the present invention.

Now, a description will be made in detail regarding this invention with reference to FIGS. 2–7.

Figure 2:
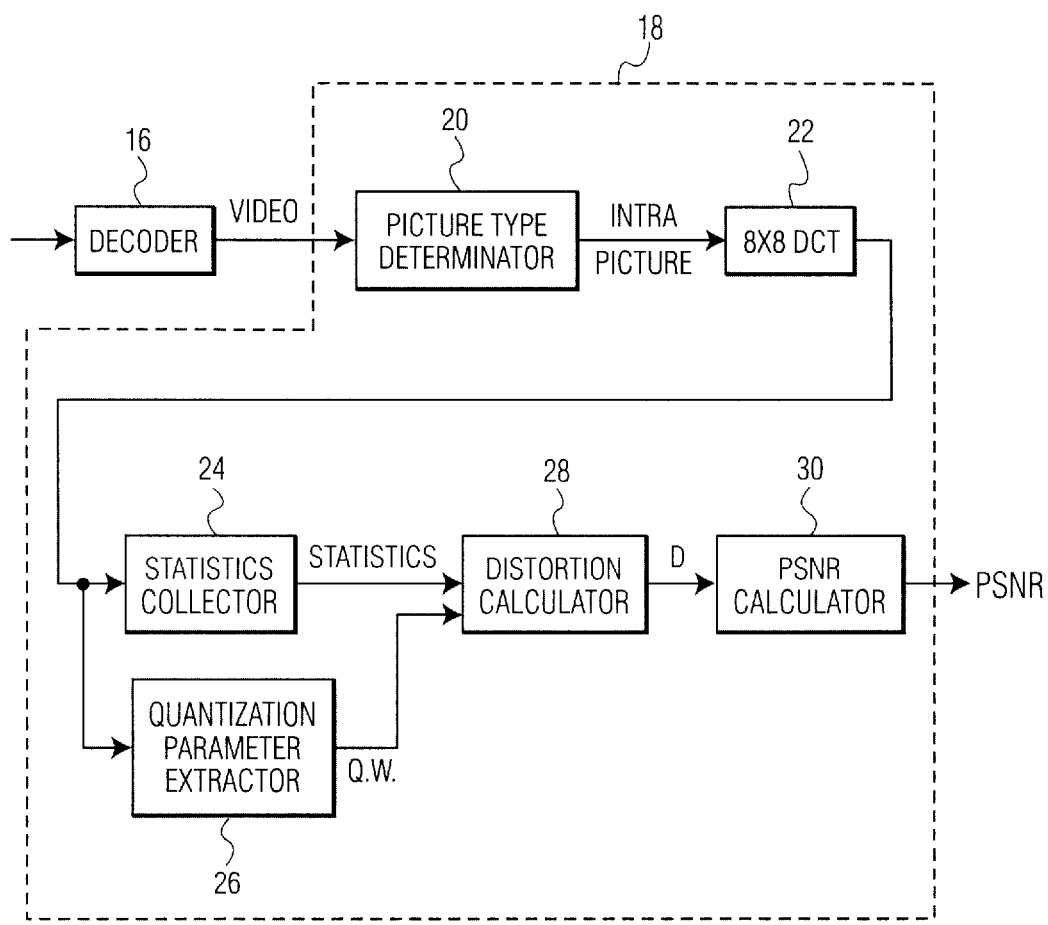
FIG. 2 is a block diagram of the estimating apparatus according to an exemplary embodiment of the present invention.

FIG. 2 depicts a representative hardware of the decoder 16 and the estimator 18 illustrated in FIG. 1 according to a first embodiment of the present invention. In particular, the first embodiment provides a mechanism for estimating video quality after the coded video data has been decompressed via the decoder 16. The estimator 18 includes a picture determinator 20, a 8×8 DCT 22, a statistics collector 24, a quantization parameter extractor 26, a distortion calculator 28, and a PSNR calculator 30. A key principle of the present invention relies on the fact that the quality of P and B pictures and hence the overall video is in general consistent with that of the intra pictures for the MPEG-2 coded video. Therefore, if the PSNR can be estimated only for intra-coded pictures, it serves as a quality metric for the overall video as a good video encoder strives to maintain a consistent quality from picture to picture.

In operation, the decoded video data, after being decoded by the decoder 16, is forwarded to the picture determinator 20 of the estimator 18. The picture determinator 20 then determines whether the decoded video data is intra-coded. In MPEG-2 video, intra_dc_precision controls the quantization coarseness of DC DCT coefficients in intra-coded macroblocks or intra-coded pictures and ranges from 8 to 11 bits, with 11 bits as the highest which results when no quantization error occurs in the intra DC coefficients. In most broadcast quality digital video, the lowest intra_DC_precision is typically set to 8. Accordingly, if the estimated intra_DC_precision less than 11, the current picture is determined to be intra-coded in the present invention. If intra-coded, the DCT block 22 subjects the decoded video data to DCT processing in order to generate DCT coefficients for AC frequency bands. Thereafter, the statistics collector 24 estimates the variance of the DCT coefficients, whereafter the estimated DCT variance is transmitted to the distortion calculator 28. At the same time, the quantization extractor 26 extracts quantization matrices that correspond to those used in a previous coding operation. U.S. Pat. No. 6,101,278 entitled, "System for Extracting Coding Parameters from Video Data," assigned to the same assignee, explains how to extract the quantization matrices ($W_{ij}$), thereby incorporated herein as a reference. The distortion calculator 28 then uses the extracted quantization matrices, quantizer step size and the estimated DCT variance to determine the average quantization error. Thereafter, the PSNR calculator 26 determines the PSNR, using the average quantization error obtained by the distortion calculator block 28. The value of PSNR is used to evaluate any degradation in the video quality.

Figure 3:
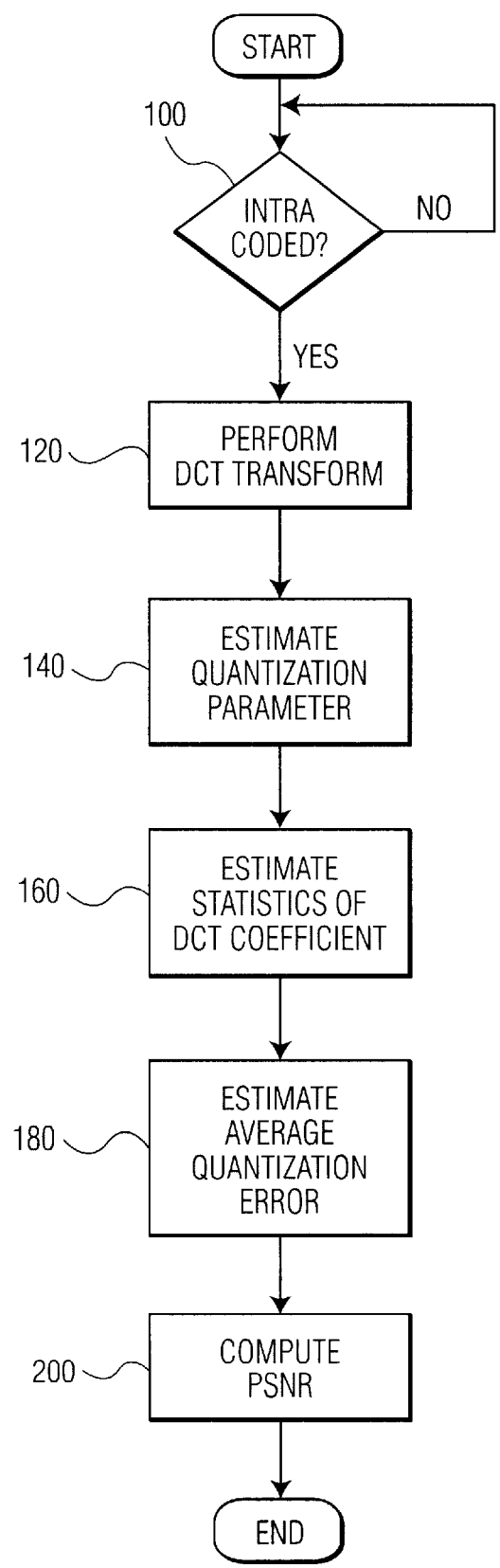
FIG. 3 is a flow chart illustrating the operation steps of the estimating apparatus in accordance with the present invention.

FIG. 3 is a flow diagram depicting the operation steps of evaluating video quality in accordance with the first embodiment of the present invention. It should be noted that the processing and decision blocks may represent steps performed by functionally equivalent circuits, such as a digital signal processor circuit or an application-specific integrated circuit (ASIC). The flow diagrams do not depict the syntax of any particular programming language. Rather, the flow diagrams illustrate the functional information that a person of ordinary skill in the art requires to fabricate circuits or to generate computer software to perform the processing required of the particular apparatus.

Upon receiving the decoded video output from the decoder 14, an 8×8 block DC precision computation is performed by the picture type determinator 20 to determine whether the decoded video is intra-coded for each macroblock in step 100. It is noted that the intra-coded pictures possess unique statistical properties from non-compressed pictures, or P and B coded pictures, and the number of bits used to represent intra DC coefficients is 11 bits before compression. Hence, if the intra DC precision is less than 11, the current picture being analyzed is classified as an intra-coded picture In step 120, the detected intra code picture is then subjected to a DCT transform by the DCT block 22 to generate DCT coefficients for AC frequency bands in the video data. In step 140, quantization matrices ($W_{ij}$) and a quantizer step size for each macroblock ($Q_m$) for the whole picture are obtained. That is, after determining that the current picture being analyzed is an intra-coded picture, the quantization parameter extractor 26 operates to extract a quantization matrix for each frame that correspond to those used in a previous coding operation. A quantization matrix consists of sixty-four entries, each entry being designated with a weight. The sixty-four entries, each being an 8-bit integer ranging from 1 to 255, correspond to 8×8 DCT coefficients in a block. The weight and the quantizer scale-value determine the quantization step-sizes for a block of DCT coefficients. The process of extracting quantization matrices ($W_{ij}$) is explained in U.S. Pat. No. 6,101,278, entitled, "System for Extracting Coding Parameters from Video Data," assigned to the same assignee, thereby incorporated herein as a reference. The quantization parameter extractor 26 further operates to extract a quantizer step size/scale for each macroblock. In order to extract a quantizer step size/scale for each macroblock, the AC coefficients in the macroblock is averaged. In the case of MPEG-2, a quantization matrix is first extracted as discussed in U.S. Pat. No. 6,101,278 to obtain the weights $W_{ij}$, for i, j=0, 1 . . . 7 and i, j (0, 0). Each AC coefficient is then weighed according to the equation below:

$$\overline{C}_{i,j} = \frac{C_{i,j} \times 16}{W_{i,j}},$$

wherein $C_{i,j}$ represents the (i, j)th AC coefficient in the current macroblock, and $\overline{C}_{i,j}$ represents the weighted or normalized AC coefficient. In other DCT-based compression schemes where quantization matrix is not utilized, i.e., where all AC coefficients in the same macroblock are quantized with the same step size, this step may be skipped. After averaging the AC coefficients in the macroblock, the operation of finding a quantization scale and a DCT type is executed by finding the largest common divisor for all normalized AC coefficients in the macroblock, or just for a selected set of coefficients, such as the first 4 AC coefficients in a zig-zag scanning order. For MPEG-2 video, this is performed on both the frame DCT data and field DCT data. Finding the largest common divisor for all normalized AC coefficients in the macroblock can be processed as follows:

```
First for frame DCT block:
q=max_Q
d_max=large number
while (q>lowest_q_allowed)
{
    d=0
    for i,j = 0,...7 and i,j    (0,0)
    {
        quantize C̄_i,j with q:    _i,j = quantize(C̄_i,j, q)
        d = d + abs(C̄_i,j− _i,j)
        if (abs(d_prev / d) > threshold) return current_DCT_Type
        and q
```

```
    q=next_lower_q
    d_prev=d
    }
}
```

In the above pseudo-code, abs( ) stands for "absolute value" operation. quantize( ) is the quantization procedure which is specified by the video coding scheme. A nominal value for threshold is 1.5.next_lower_q and determined according to different coding schemes. The above code essentially performs a search operation through possible quantization scale values and DCT types. When the search starts, the DCT type is initiated to frame DCT as the frame-based DCT is more likely used in MPEG-2 coded video. For other video coding standards, such as MPEG-1, MPEG-4 and H.263, or MPEG-2 field pictures, the DCT type will remain as frame based. The quantization scale is initiated to the highest value allowed by the standard. For example, in MPEG-2, this number is 62 or 112 depending on the coding scheme used for quantization scale. For each quantization scale value, the quantization distortion is computed for the current macroblock. The computed distortion is then compared with the previous computed and stored distortion. If the reduction in distortion in terms of ratio between the two exceeds a certain threshold (set to 1.5 above), then the current quantization scale is extracted and returned. If not, the current distortion is stored, and the search resumes with the next higher quantization scale as dictated by the standard or coding scheme. If a quantization scale is not extracted from frame DCT data, then the same search options are performed on the field DCT data. Alternatively, the search can start with the lowest possible quantization scale and proceeds up, or start with more likely quantization scales. For example, 10 for DVD video or DVB video, and higher than 10 for lower bit rate video. Accordingly, the largest common divider for all normalized AC coefficients calculated, as described in the preceding paragraphs, to determine the DCT type and the quantization scale per macroblock.

Meanwhile, in step 160, estimating statistics of DCT coefficients is performed. For each AC location (i, j), the variance of the coefficients $\lambda^2_{i,j}$ is estimated according to the formula below:

$$\lambda^2_{i,j} = \frac{\sum_{b=1}^{N}(C^b_{i,j})^2}{2N}$$

wherein $C^b_{ij}$ represents the (i, j)th AC coefficient in block b, and N represents the total number of blocks in the picture. It should be noted that step 140 and step 160 can be performed simultaneously in accordance with the present invention.

After determining the DCT statistics $\lambda^2_{i,j}$, in step 160, the average quantization error is estimated in step 180. This is performed for each set of DCT coefficients corresponding to the same DCT location. Calculating the quantization error is explained in the U.S. Pat. No. 6,067,118 entitled, "Method of Frame-By-Frame Calculation of Quantization Matrices," assigned to the same assignee, and herein incorporated by simple reference. For DC, the quantization error $D_{0,0}$ is estimated to be half that of the intra-DC quantization step size according to the table below.

| Intra_DC_Precision | Average DC quantization error |
|---|---|
| 8 | 4 |
| 9 | 2 |
| 10 | 1 |
| 11 | 0 |

Hence, the (i, j)th AC location, the quantization error $D_{i,j}$ is estimated as follows:

$$D_{i,j} = 2\lambda_{i,j}^2 \left(1 - \frac{\beta_{i,j}}{e^{\beta_{i,j}/2} - e^{-\beta_{i,j}/2}}\right)$$

where $\beta_{i,j} = \Delta_{i,j}/\lambda_{i,j} = \frac{W_{i,j}Q}{16\lambda_{i,j}}$.

In the event that all coefficients corresponding to an AC location are zero, either because of coarse quantization during encoding or small magnitude of the coefficients, $\lambda_{i,j}$ may be estimated according to the following equation:

$$\frac{1}{\lambda_{i,j}} e^{-\frac{W_{i,j}Q/16}{2\lambda_{i,j}}} = \frac{1}{N},$$

wherein N represents the number of blocks in the picture. Alternatively, a look-up-table may be utilized to solve the equation quickly. The average quantization error or distortion for this AC location is then estimated as follows:

$$D_{i,j} = 2\lambda^2_{i,j}$$

Here, it is assumed that the true distribution of the (i, j)th coefficients range from all 0 (with no quantization error) to the Laplacian distribution with parameter $\lambda_{i,j}$ (with quantization error $2\lambda^2_{i,j}$). Finally, the overall average distortion in the DCT domain is computed as follows:

$$D = \frac{\sum_{i=0, j=0}^{i=7, j=7} D_{i,j}}{64}.$$

Finally, in step 200, the PSNR is calculated as follows:

$$PSNR = 10 \log_{10} \frac{255 \times 255}{D}$$

The peak signal-to-noise ratio (PSNR) obtained, as described in the preceding paragraph, can be used to evaluate the picture quality in accordance with the present invention.

Figure 4:
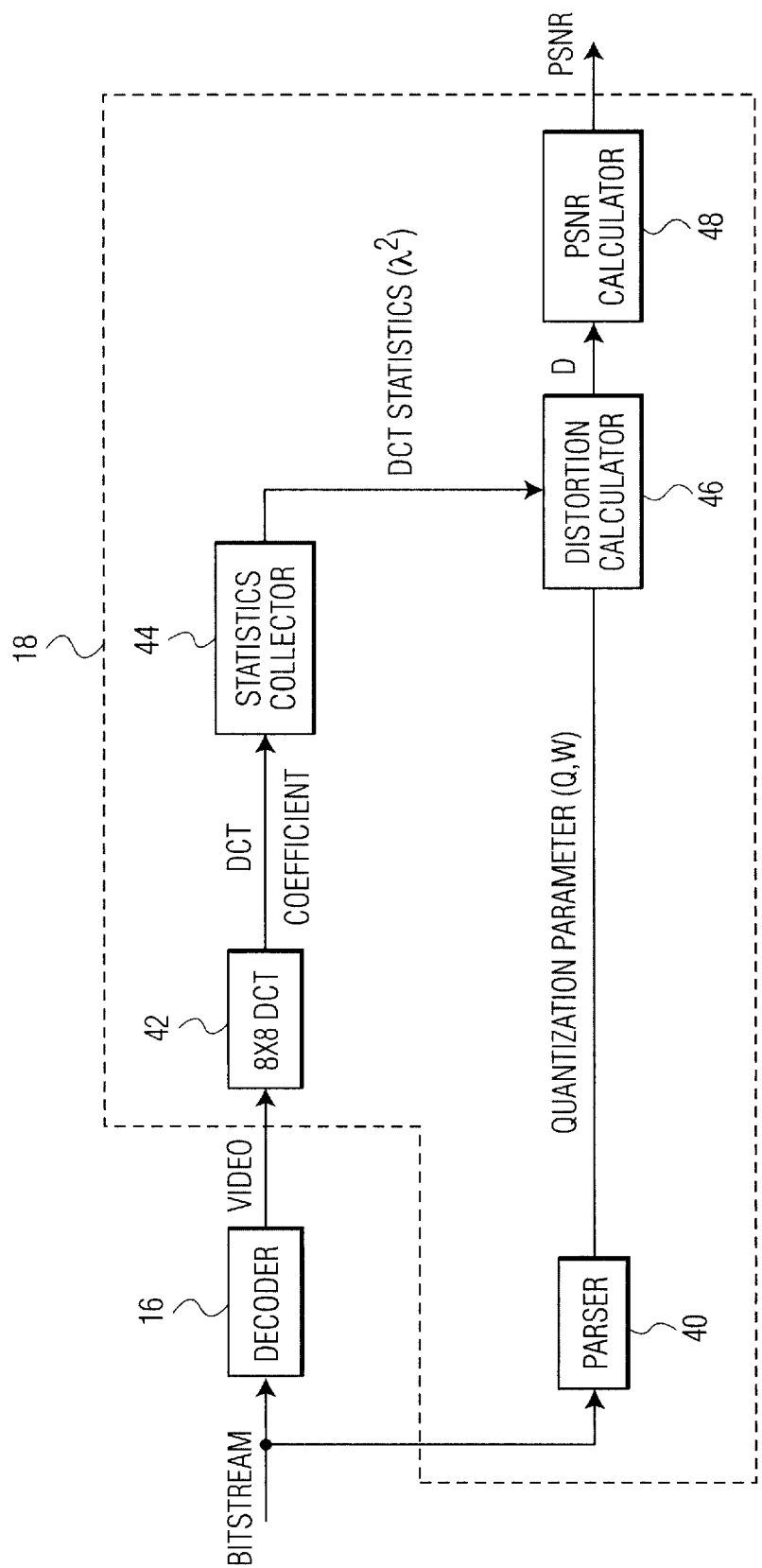
FIG. 4 is a simplified block diagram of the estimating apparatus according to another exemplary embodiment of the present invention.

FIG. 4 depicts a representative hardware of the decoder 16 and the estimator 18 illustrated in FIG. 1 according to a second embodiment of the present invention. The decoder 16 includes a parser 40, DCT block 42, a statistics collector 44, a distortion calculator 46, and a PSNR calculator 48. In operation, an incoming bitstream is decoded by the decoder 16, and the decoded video data is subjected to DCT processing by the DCT block 42 in order to generate DCT coefficients for AC frequency bands in the video data. The statistics collector 44 estimates variance of the DCT coefficients, whereafter the estimated DCT variance is transmitted to the distortion calculator 46. Meanwhile, the parser 40 extracts quantization matrices from the incoming bitstream that correspond to those used in a previous coding operation. The distortion calculator block 46 uses the quantization matrices and the DCT variance to determine the average quantization error. Finally, the PSNR calculator block 48 determines the PSNR using the average quantization error obtained by the distortion calculator block 24.

Figure 5:
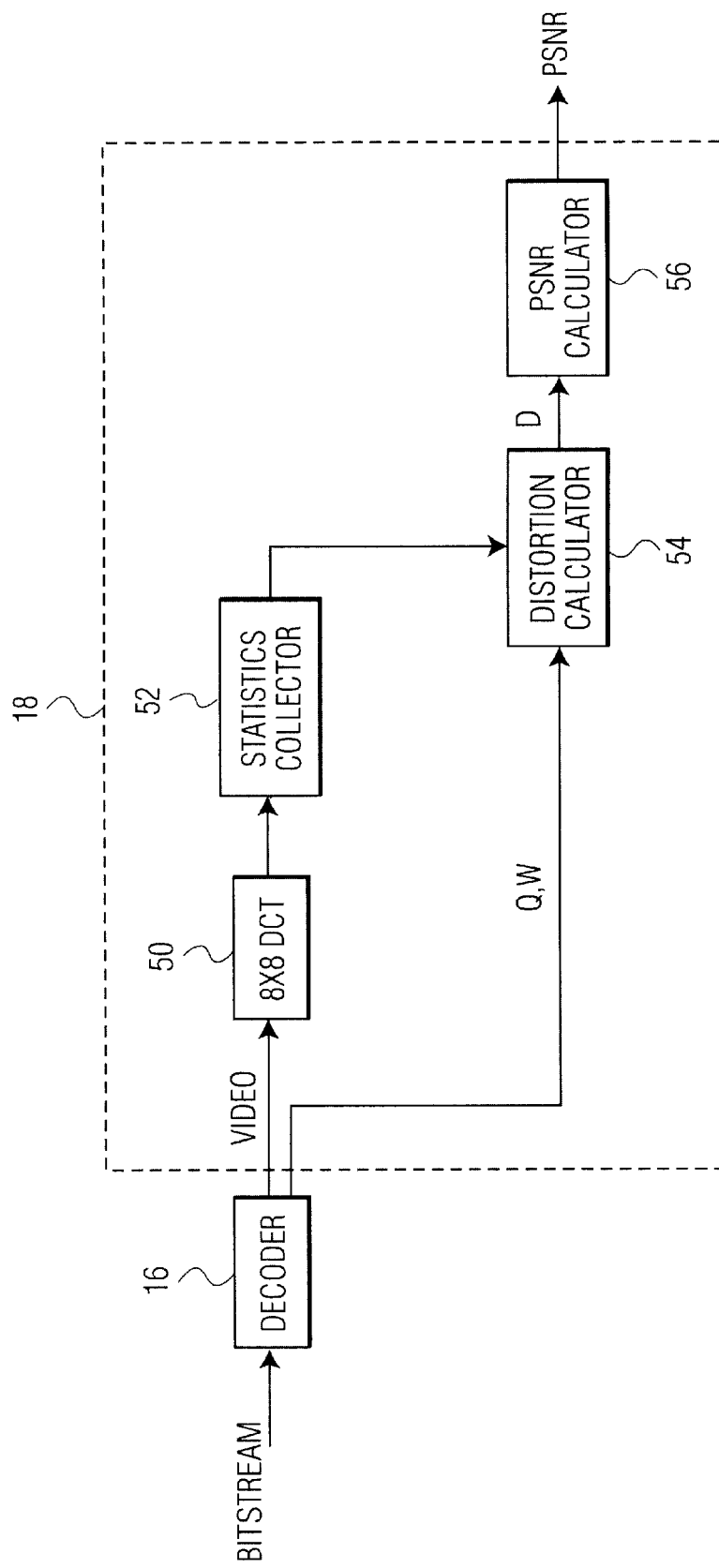
FIG. 5 is a simplified block diagram of the estimating apparatus according to another exemplary embodiment of the present invention.

FIG. 5 depicts a representative hardware of the decoder 16 and estimator 18 illustrated in FIG. 1 according to a third embodiment of the present invention. The construction and operation of the second embodiment are essentially the same as that described above with respect to FIG. 2(a). The only notable difference is that the function of the parser 40 is incorporated in the estimator 18 in the second embodiment. Hence, the discussion of similar components described in the preceding paragraphs is omitted to avoid redundancy, as they are described with respect to FIG. 4.

Figure 6:
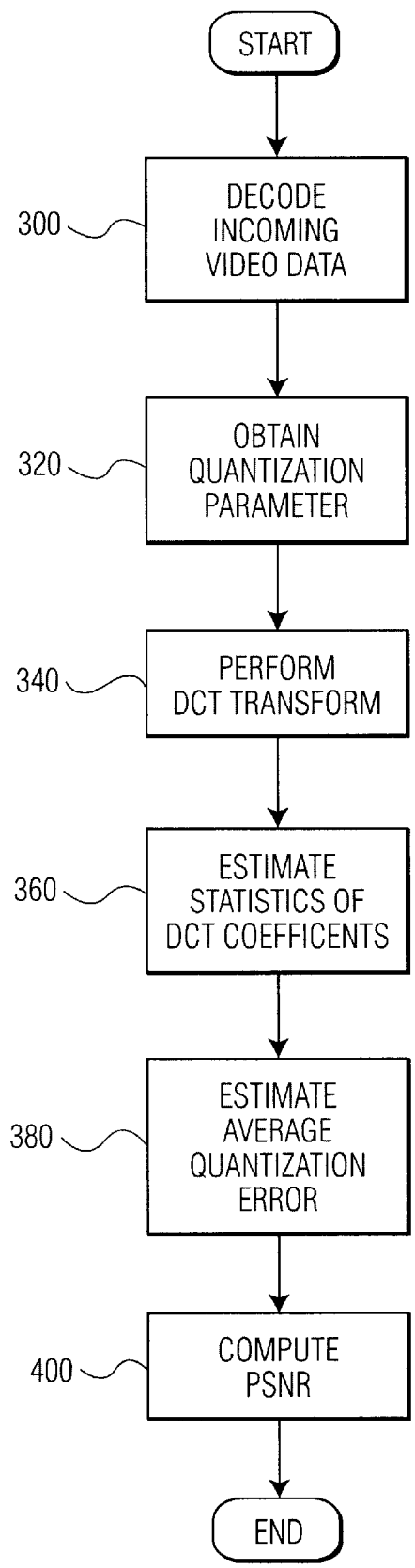
FIG. 6 is a flow chart illustrating the operation steps of the estimating apparatus in accordance with the present invention; and, FIG. 7 is a simplified block diagram of the estimating apparatus according to another exemplary embodiment of the present invention

FIG. 6 is a flow diagram depicting the operation steps of evaluating video quality in accordance with the second and third embodiments of the present invention. It should be noted that the processing and decision blocks may represent steps performed by functionally equivalent circuits such as a digital signal processor circuit or an application specific integrated circuit (ASIC). In addition, the flow diagrams illustrate the functional information that a person of ordinary skill in the art requires to fabricate circuits or to generate computer software to perform the processing required of the particular apparatus. Specifically, with reference to FIGS. 4 and 5, the incoming video data is decoded in step 100. From the decoded video data, the intra_DC_precision, quantization matrices ($W_{ij}$), and quantization step size for each macroblock $Q_m$ for the whole picture are extracted in step 320. A quantization matrix consists of sixty-four entries, each entry being designated with a weight. The sixty-four entries, each being an 8-bit integer ranging from 1 to 255, correspond to 8×8 DCT coefficients in a block. The weight and the quantizer scale-value determine quantization step-sizes for a block of DCT coefficients. Thereafter, in step 340, the decoded video data is subjected to a DCT transform to generate DCT coefficients for AC frequency bands in the video data.

In step 360, estimating statistics of DCT Coefficients is performed. For each AC location (i, j), the variance of the coefficients $\lambda^2_{i,j}$ is estimated according to the formula below:

$$\lambda^2_{i,j} = \frac{\sum_{b=1}^{N}(C^b_{i,j})^2}{2N}$$

wherein $C^b_{ij}$ represents the (i, j)th AC coefficient in block b, and N represents the total number of blocks in the picture.

After determining the DCT statistics $\lambda^2_{i,j}$ in step 380, the average quantization error is estimated. This is performed for each set of DCT coefficients corresponding to the same DCT location. Calculating the quantization error is explained in the U.S. Pat. No. 6,067,118 entitled, "Method of Frame-By-Frame Calculation of Quantization Matrices," assigned to the same assignee, and herein incorporated by simple reference. For DC, the quantization error $D_{0,0}$ is estimated to be half that of the intra-DC quantization step size according to the table below:

| Intra_DC_Precision | Average DC quantization error |
|---|---|
| 8 | 4 |
| 9 | 2 |

-continued

| Intra_DC_Precision | Average DC quantization error |
|---|---|
| 10 | 1 |
| 11 | 0 |

For the (i, j)th AC location, the quantization error $D_{i,j}$ is estimated as follows:

$$D_{i,j} = 2\lambda_{i,j}^2 \left(1 - \frac{\beta_{i,j}}{e^{\beta_{i,j}/2} - e^{-\beta_{i,j}/2}}\right)$$

where $\beta_{i,j} = \Delta_{i,j}/\lambda_{i,j} = \frac{W_{i,j}Q}{16\lambda_{i,j}}$.

In the event that all coefficients corresponding to an AC location are zero either because of coarse quantization during encoding or a small magnitude of the coefficients, $\lambda_{i,j}$ may be estimated according to the following equation:

$$\frac{1}{\lambda_{i,j}} e^{-\frac{W_{i,j}Q/16}{2\lambda_{i,j}}} = \frac{1}{N},$$

wherein N represents the number of blocks in the picture. Alternatively, a look-up-table may be utilized to solve the equation quickly. The average quantization error or distortion for this AC location is then estimated as follows:

$$D_{i,j} = 2\lambda^2_{i,j}.$$

Here, it is assumed that the true distribution of the (i, j)th coefficients range from all 0 (with no quantization error) to the Laplacian distribution with the parameter $\lambda_{i,j}$ (with quantization error $2\lambda^2_{i,j}$). The overall average distortion in DCT domain is computed as follows:

$$D = \frac{\sum_{i=0,j=0}^{i=7,j=7} D_{i,j}}{64}.$$

Finally, in step 400, the PSNR is calculated as follows:

$$PSNR = 10 \log_{10} \frac{255 \times 255}{D}.$$

Accordingly, the peak signal-to-noise ratio (PSNR) necessary to evaluate the picture quality is obtained.

Figure 7:
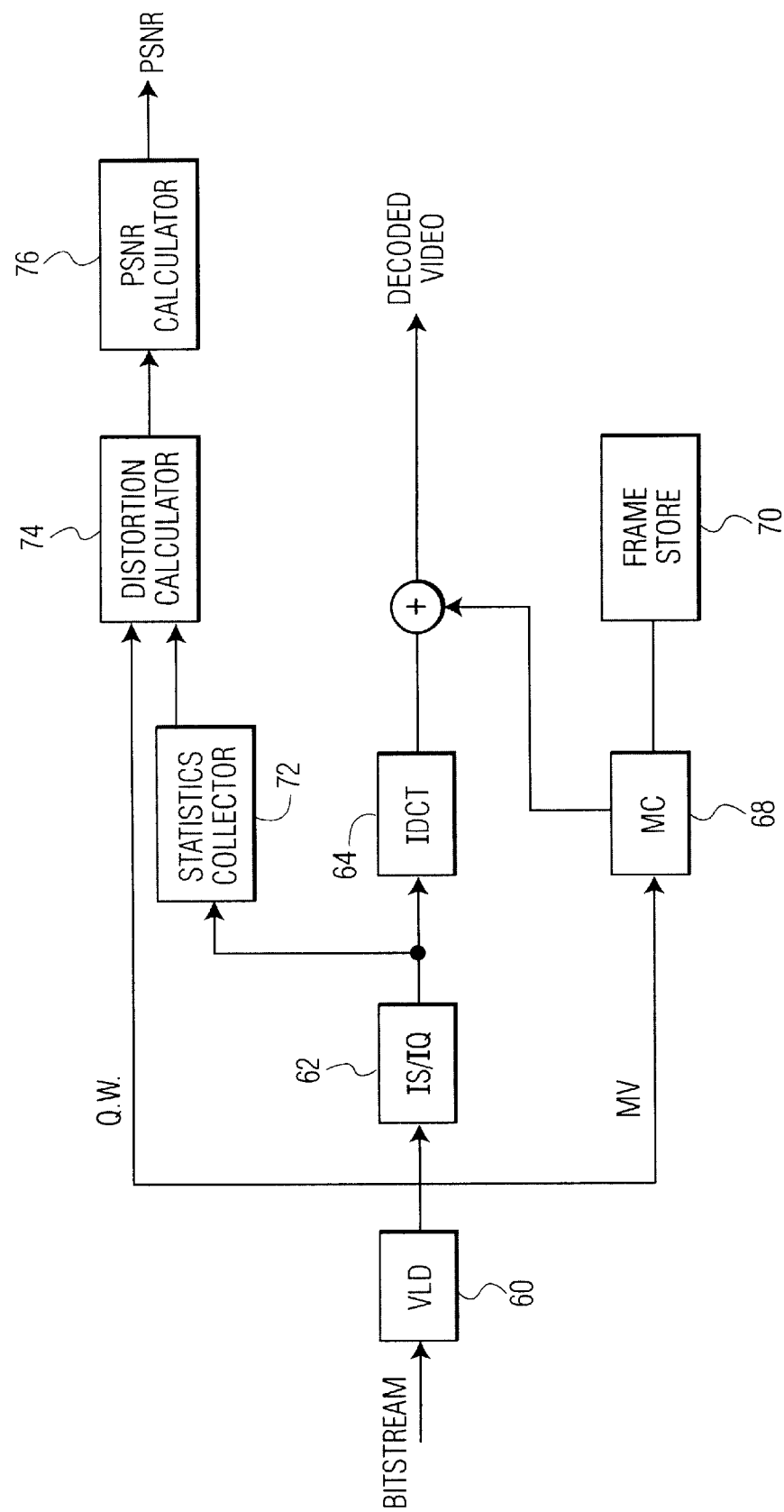

FIG. 7 illustrates a fourth embodiment of the present invention in which the hardware of the estimator is integrated into a conventional decoder. The decoder according to the present invention is a programmable video decoding system, which includes: a variable length decoder (VLD) 60 configured to receive and decode a stream of block-based data packets; an inverse quantizer 62 coupled to receive the output of the VLD 60 to operatively inverse quantize the quantized data received from the VLD 60; an inverse discrete cosine transformer (IDCT) 61 coupled to the output of the inverse quantizer for transforming the dequantized data from a frequency domain to a spatial domain; a motion compensator (MC) 68 configured to receive motion vector data from the quantized data and to generate a reference signal based on motion-compensated block of a preceding frame stored in a preceding frame stage and a motion-compensated block of a succeeding frame stored from a frame storage 70; an adder for receiving the reference signal and the spatial domain data from the IDCT 64 to form motion-compensated pictures; a statistics collector 72 for estimating the variance of the DCT coefficients; a distortion calculator block 74 for determining the average quantization error 74 based on the quantization matrices; and, a PSNR calculator 76 for determining the PSNR using the average quantization error obtained by the distortion calculator block 74.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method for evaluating the quality of encoded video data, the method comprising the steps of:

decoding at least a substantial portion of said encoded video data to produce decompressed video data including a plurality of blocks;

performing a discrete cosine transform (DCT) on said decompressed video data to produce a set of DCT coefficients for at least one AC frequency band;

simultaneously, extracting quantization matrix data for the at least one AC frequency band and extracting a quantizer scale for each block of said decompressed video data;

estimating a variance of said DCT coefficients;

determining an average quantization error for each set of said DCT coefficients based on said variance, said quantization matrix, and said quantizer scale; and, calculating a peak signal to noise ratio (PSNR) based on said average quantization error.

2. The method of claim 1, wherein said quantizer step size is calculated by averaging the AC coefficients in each of said decompressed video data as follows:

$$\overline{C}_{i,j} = \frac{C_{i,j} \times 16}{W_{i,j}},$$

where $C_{i,j}$ represents the (i, j)th AC coefficient in the current block, $\overline{C}_{i,j}$ represents the normalized AC coefficient, and $W_{i,j}$ represents the (i, j)th quantization matrix.

3. The method of claim 2, wherein the variance of the coefficients $(\lambda^2_{ij})$ is determined by the following equation:

$$\lambda^2_{i,j} = \frac{\sum_{b=1}^{N} (C^b_{i,j})^2}{2N},$$

where $C^b_{ij}$ represents the (i, j)th AC coefficient in each block (b), and N represents the total number of blocks.

4. The method of claim 3, wherein the average quantization error (D) is computed as follows:

$$D = \frac{\sum_{i=0,j=0}^{i=7,j=7} D_{i,j}}{64},$$

and $D_{i,j} = 2\lambda^2_{i,j}$, where $\lambda^2_{ij}$ represents the variance of the coefficients ($\lambda^2_{ij}$), and $D_{i,j}$ represents the quantization error for the (i, j)th AC coefficient in each block.

5. The method of claim 4, wherein said PSNR is calculated as follows:

$$PSNR = 10 \log_{10} \frac{255 \times 255}{D},$$

where D represents an average quantization error.

6. The method of claim 1, wherein said quantization matrix and said quantizer scale correspond substantially to coding parameters used in a coding operation that was previously performed on said encoded video data.

7. The method of claim 1, wherein said quantization matrix and said quantizer scale correspond substantially to coding parameters used in a coding operation that was previously performed on said encoded video data.

8. A method for evaluating the quality of encoded video data, the method comprising the steps of:
   at least partially decompressing said encoded video data in an MPEG decoder and outputting a decompressed video data including a plurality of blocks;
   detecting an intra-coded picture in each block of said decompressed video data;
   if detected, performing a discrete cosine transform (DCT) on said decompressed video data to produce a set of DCT coefficients for at least one AC frequency band;
   extracting quantization matrix data for the at least one AC frequency band;
   extracting a quantizer scale for each block of said decompressed video data;
   estimating a variance of said DCT coefficients;
   determining an average quantization error for each set of said DCT coefficients; and,
   calculating a peak signal to noise ratio (PSNR) based on said average quantization error.

9. The method of claim 8, wherein said detecting step comprises the steps of:
   performing a DC computation operation to recover the intra-dc-precision level from said decompressed video data; and,
   if said intra-dc-precision level is less than a predefined threshold, classifying said decoded video data as an intra-coded picture.

10. The method of claim 8, wherein said quantizer step size is calculated by averaging the AC coefficients in each of said decompressed video data as follows:

$$\overline{C}_{i,j} = \frac{C_{i,j} \times 16}{W_{i,j}},$$

where $C_{i,j}$ represents the (i, j)th AC coefficient in the current block, $\overline{C}_{i,j}$ represents the normalized AC coefficient, and $W_{i,j}$ represents the (i, j)th quantization matrix.

11. The method of claim 10, wherein the variance of the coefficients ($\lambda^2_{ij}$) is determined by the following equation:

$$\lambda^2_{i,j} = \frac{\sum_{b=1}^{N}(C^b_{i,j})^2}{2N}$$

where $C^b_{ij}$ represents the (i, j)th AC coefficient in each block (b), and N represents the total number of blocks.

12. The method of claim 11, wherein the average quantization error (D) is computed as follows:

$$D = \frac{\sum_{i=0,j=0}^{i=7,j=7} D_{i,j}}{64},$$

and $D_{i,j} = 2\lambda^2_{i,j}$, where $\lambda^2_{ij}$ represents the variance of the coefficients ($\lambda^2_{ij}$), and $D_{i,j}$ represents the quantization error for the (i, j)th AC coefficient in each block.

13. The method of claim 12, wherein said PSNR is calculated as follows:

$$PSNR = 10 \log_{10} \frac{255 \times 255}{D}$$

where D represents an average quantization error.

14. An apparatus for evaluating the quality of encoded video data comprising:
   a decoder for decoding at least a substantial portion of said encoded video data to produce decoded video data including a plurality of blocks;
   a discrete cosine transform (DCT) configured to transform said decompressed video data into a set of DCT coefficients for at least one AC frequency band;
   an extractor for extracting quantization matrix data for the at least one AC frequency band and for extracting a quantizer scale for each block of said decompressed video data;
   a collector for estimating a variance of said DCT coefficients;
   a first calculator for determining an average quantization error for each set of said DCT coefficients based on said variance, said quantization matrix, and said quantizer scale; and,
   a second calculator for determining a peak signal to noise ratio (PSNR) based on said average quantization error.

15. The apparatus of claim 14, further comprising a picture detector for detecting for an intra-coded picture in each block of said decompressed video data.

16. The apparatus of claim 15, wherein said picture detector comprises:
   means for performing a DC computation operation to recover an intra-dc-precision level from said decompressed video data; and,
   means for classifying said decoded video data as an intra-coded picture when said intra-dc-precision level is less than a predefined threshold.

17. The apparatus of claim 14, wherein said quantization matrix and said quantizer scale correspond substantially to coding parameters used in a coding operation that was previously performed on said encoded video data.

18. The apparatus of claim 14, wherein said quantizer step size is calculated by averaging the AC coefficients in each of said decompressed video data as follows:

$$\overline{C}_{i,j} = \frac{C_{i,j} \times 16}{W_{i,j}},$$

where $C_{i,j}$ represents the (i, j)th AC coefficient in current block, $\overline{C}_{i,j}$ represents the normalized AC coefficient, and $W_{i,j}$ represents the (i, j)th quantization matrix.

19. The apparatus of claim 18, wherein the variance of the coefficients ($\lambda^2_{ij}$) is determined by the following equation:

$$\lambda^2_{i,j} = \frac{\sum_{b=1}^{N}(C^b_{i,j})^2}{2N},$$

where $C^b_{ij}$ represents the (i, j)th AC coefficient in each block (b), and N represents the total number of blocks.

20. The apparatus of claim 19, wherein the average quantization error (D) is computed as follows:

$$D = \frac{\sum_{i=0,j=0}^{i=7,j=7} D_{i,j}}{64},$$

and $D_{i,j} = 2\lambda^2_{i,j}$, where $\lambda^2_{ij}$ represents the variance of the coefficients ($\lambda^2_{ij}$), and $D_{i,j}$ represents the quantization error for the (i, j)th AC coefficient in each block.

21. The apparatus of claim 20, wherein said PSNR is calculated as follows:

$$PSNR = 10\ \log_{10} \frac{255 \times 255}{D},$$

where D represents an average quantization error.

22. An apparatus for evaluating the quality of encoded video data comprising:
 a decoder configured to decode compressed variable-length Huffman codes and for producing therefrom decoded data, and for extracting quantization matrix data and a quantizer scale for each block of said decoded video data;
 an inverse quantizer configured to perform inverse-quantizing of the decoded data output from said decoder to produce a set of DCT coefficients;
 an inverse DCT configured to transform values of pixels in blocks of signals output from said inverse quantizer to dequantize decoded data including difference data;
 a motion compensation and adder for receiving reference data within the encoded video data and said difference data from said inverse DCT to form motion-compensated pictures therefrom;
 a collector coupled to the output of said inverse quantizer for estimating a variance of said DCT coefficients;
 a first calculator for determining an average quantization error for each set of said DCT coefficients based on said variance, said quantization matrix, and said quantizer scale; and,
 a second calculator for determining a peak signal to noise ratio (PSNR) based on said average quantization error.

23. The apparatus of claim 22, further comprising a video memory configured to store reproduced video data.

24. The apparatus of claim 22, wherein said quantization matrix and said quantizer scale correspond substantially to coding parameters used in a coding operation that was previously performed on said encoded video data.

25. A system for evaluating the quality of encoded video data comprising:
 a memory for storing a computer-readable code; and,
 a processor operatively coupled to said memory, said processor configured to:
 decompress said encoded video data to produce a decompressed video data including a plurality of blocks;
 detect an intra-coded picture in each block of said decompressed video data;
 if detected, perform a discrete cosine transform (DCT) on said decompressed video data to produce a set of DCT coefficients for at least one AC frequency band;
 extract quantization matrix data for the at least one AC frequency band;
 extract a quantizer scale for each block of said decompressed video data;
 estimate a variance of said DCT coefficients;
 determine an average quantization error for each set of said DCT coefficients; and,
 calculate a peak signal to noise ratio (PSNR) based on said average quantization error.

26. The system of claim 25, wherein the detection of said intra-coded picture includes the steps of:
 performing a DC computation operation to recover an intra-dc-precision level from said decompressed video data; and,
 classifying said decoded video data as an intra-coded picture when said intra-dc-precision level is less than a predefined threshold.

27. The apparatus of claim 25, wherein said quantization matrix and said quantizer scale correspond substantially to coding parameters used in a coding operation that was previously performed on said encoded video data.

* * * * *